(12) United States Patent
Xu et al.

(10) Patent No.: US 6,395,064 B1
(45) Date of Patent: May 28, 2002

(54) SYSTEM AND METHOD FOR PURIFYING AND DISTRIBUTING CHEMICAL GASES

(75) Inventors: Mindi Xu, Naperville; Richard Udischas, Joliet, both of IL (US); Carol Schnepper, Tulsa, OK (US); Joseph Paganessi, Burr Ridge, IL (US)

(73) Assignee: American Air Liquide, INC, Fremont, CA (US)

( * ) Notice: Subject to any disclaimer, the term of this patent is extended or adjusted under 35 U.S.C. 154(b) by 0 days.

(21) Appl. No.: 09/426,875

(22) Filed: Oct. 26, 1999

(51) Int. Cl.$^7$ .............................. B01D 1/16; B01D 19/00
(52) U.S. Cl. ................. 95/15; 95/18; 95/19; 95/241; 95/273; 96/173; 96/174; 96/188; 96/200; 96/218
(58) Field of Search .............................. 95/90, 92, 128, 95/247, 250, 251, 266, 14, 15, 18, 19, 241, 254, 273; 96/108, 189, 193, 194, 200, 203, 206, 173, 174, 188, 218, 219

(56) References Cited

U.S. PATENT DOCUMENTS

| | | | |
|---|---|---|---|
| 1,535,754 A | * 4/1925 | Williams | 95/266 X |
| 2,571,219 A | * 10/1951 | De Cew | 95/266 X |
| 2,797,767 A | * 7/1957 | Brooke et al. | 96/200 X |
| 2,937,140 A | * 5/1960 | Stinson | 95/247 X |
| 3,535,090 A | * 10/1970 | Durrell et al. | 95/128 |
| 4,300,919 A | * 11/1981 | Lewis et al. | 95/266 X |
| 4,407,665 A | * 10/1983 | Lasater | 95/266 |
| 4,523,934 A | * 6/1985 | Joshua | 96/193 |
| 4,723,967 A | * 2/1988 | Tom | 96/108 X |
| 4,738,693 A | * 4/1988 | Tom | 96/108 X |
| 4,935,151 A | * 6/1990 | Do | 95/166 X |
| 5,165,247 A | * 11/1992 | Rockenfeller et al. | 95/128 X |
| 5,372,621 A | * 12/1994 | Staton et al. | 96/206 X |
| 5,632,603 A | * 5/1997 | Taylor et al. | 96/193 X |
| 5,761,911 A | 6/1998 | Jurcik et al. | 62/50.2 |
| 5,858,466 A | * 1/1999 | Liu et al. | 96/194 X |
| 5,985,004 A | * 11/1999 | Boyd | 96/189 X |
| 5,985,008 A | * 11/1999 | Tom et al. | 96/108 X |
| 6,027,547 A | * 2/2000 | Tom et al. | 95/128 X |
| 6,224,677 B1 | * 5/2001 | Nozawa et al. | 95/128 X |

* cited by examiner

Primary Examiner—Robert H. Spitzer
(74) Attorney, Agent, or Firm—Linda K. Russell

(57) ABSTRACT

Provided is a novel system for vaporizing and purifying a gas to produce ultrapure chemical gases employed at a semiconductor processing facility. The system includes a liquified gas source, a vaporization purification bed, and a buffer tank. The liquefied gas source is in communication with the vaporization purification bed to provide a liquefied gas to the bed with an ultra-pure chemical gas generated in the purification bed. The purified gas is subsequently routed to a buffer tank and to a point of use therefrom.

38 Claims, 3 Drawing Sheets

SYSTEM AND METHOD FOR PURIFYING AND DISTRIBUTING CHEMICAL GASES

BACKGROUND OF THE INVENTION

1. Field of the Invention

This invention relates to the purification and distribution of process chemical gases to an end user, in particular, the purification and distribution of ultrapure electronic specialty gases to semiconductor wafer and chip processing tools.

2. Description of the Related Art

In semiconductor manufacturing industry, many different high purity chemical gases are needed for etching, deposition, and surface cleaning. A partial list of such chemical gases includes ammonia ($NH_3$), hydrogen chloride (HCl), hydrogen bromide (HBr), nitrous oxide ($N_2O$), sulfur hexafluoride ($SF_6$), carbon dioxide ($CO_2$), hydrogen fluoride (HF), fluoromethane ($CH_3F$), hexafluoroethane ($C_2F_6$), tungsten hexafluoride ($WF_6$), chlorine ($Cl_2$), boron trichloride ($BCl_3$), perfluoro-propane($C_3F_8$), trifluorochloromethane($ClF_3$), dichlorosilane ($SiH_2Cl_2$), disilane ($Si_2H_6$), trichlorosilane ($SiHCl_3$), silane tetrachlorosilane ($SiCl_4$) etc.

A known method of distributing these gases is to have the gases flow through a distribution system under their vapor pressure from the source to the user stations. Systems and methods for controlled delivery of liquefied gases are further discussed in U.S. Pat. No. 5,761,911 and U.S. Ser. No. 08/893,499, which are incorporated herein by reference in their entirety.

Many of the chemicals employed in the semiconductor manufacturing processes, while introduced to the processing tools in the gaseous state, are stored as liquids in gas cylinders under their own respective vapor pressures. The cylinders with a typical volume of less than about 50 liters are usually housed within gas cabinets.

A single gas cabinet typically supplies the chemical vapor to a single or at most several semiconductor processing tools. Operation of the gas cabinets and the cylinders housed therein can be hazardous, labor intensive and costly activity. As the chemical is depleted, it is imperative that the gas cylinder can be replaced with careful and proper handling procedures.

In order to reduce the total number of gas cabinets required in the semiconductor manufacturing facility, it has recently been proposed that a single gas cabinet service multiple processing tools. Since the volumes of the cylinders housed in the gas cabinets do not increase with the number of processing tools being serviced, replacement frequency of the cylinder cabinets necessarily increases. It is, however, desirable to minimize the frequency of cylinder replacement not only for safety concerns but also to reduce the risk of introducing impurities that may cause significant product loss.

In addition, the vapor pressure of a chemical gas is strongly dependent on temperature and, therefore, the attainable flow varies upon changes in ambient temperature. As a result, it is difficult to maintain a desired flow rate to meet the user's needs. For some of the chemicals, the vapor pressures are not high enough to have the gas flow to a remote locale even at high ambient temperatures. Heat may be supplied to the source to keep the temperature within an acceptable range. Nonetheless, even by maintaining the temperatures within a predetermined range the gas purity is not assured because liquid droplets with impurities become entrained in the gas during a non-stable evaporation inside the bulk container.

To meet the requirements of the semiconductor processing industry and to overcome the disadvantages of the related art, it is an object of the present invention to provide a novel system for gas purification and distribution with ease of operation and control.

It is another object of the invention to fully vaporize and purify gases.

It is a further object of the invention to provide a flexible system needed to accommodate various gases and their delivery to the point of use in a quick and facile manner.

It is yet another object of the invention to provide a compact system accommodated in a limited space, wherein the system can be operated in close proximity to the users.

Other objects and aspects of the present invention will become apparent to one of ordinary skill in the art upon review of the specification, drawings and claims appended hereto.

SUMMARY OF THE INVENTION

According to a first aspect of the present invention, a novel distribution system for ultrapure chemical gases to the point of use at a semiconductor processing facility is provided. The system includes a liquefied gas source, a vaporization purification device, and, a buffer tank. The liquefied gas source is in communication with the vaporization purification device to provide a liquefied gas to the bed. An ultrapure chemical gas is generated in the vapor purification bed, and the vapor is routed to a buffer tank and further to a point of use from the buffer tank.

According to a further aspect of the invention, a system for vaporizing and purifying a gas is provided. The system includes a supply tank, wherein a chemical gas is disposed. The supply tank is connected to a temperature containment chamber having at least one vaporization purification bed therein and a buffer tank disposed downstream of said temperature containment chamber.

According to yet another aspect of the invention, a vaporization and purification device system is provided. The system includes a tubular main body having a first and a second end. The first end includes a nozzle connected thereto, wherein a liquid chemical is introduced at a pressure higher than the pressure within the tubular main body to vaporize and purify the chemical. The system further includes a second end having a three-way connector attached thereto.

According to a further aspect of the invention, a method for providing ultrapure chemical gases to the point of use at a semiconductor processing facility is provided. The method includes supplying a chemical gas to a containment chamber having at least one vaporization and purification device therein. The chemical gas in the containment chamber is vaporized and purified by passing the chemical gas through at least one vaporization and purification device. The light impurities are eliminated through a pressure relief valve disposed at a top end of the containment chamber. Thereafter, the ultrapure chemical generated is routed to a buffer tank and distributed to a point of use.

Thus, in accordance with the inventive system chemical gases are vaporized, purified and delivered to a point of use in an ultra-pure form in a quick and facile manner.

BRIEF DESCRIPTION OF THE DRAWINGS

The objects and advantages of the invention will become apparent from the following detailed description of the preferred embodiments thereof in connection with the accompanying drawings, in which.

DETAILED DESCRIPTION OF THE PREFERRED EMBODIMENTS OF THE INVENTION

A preferred embodiment of the invention will be described with reference to FIG. 1, which illustrates a process flow diagram of a distribution system 810 for delivery of gas to a point of use in accordance with one exemplary aspect of the invention.

Figure 1:
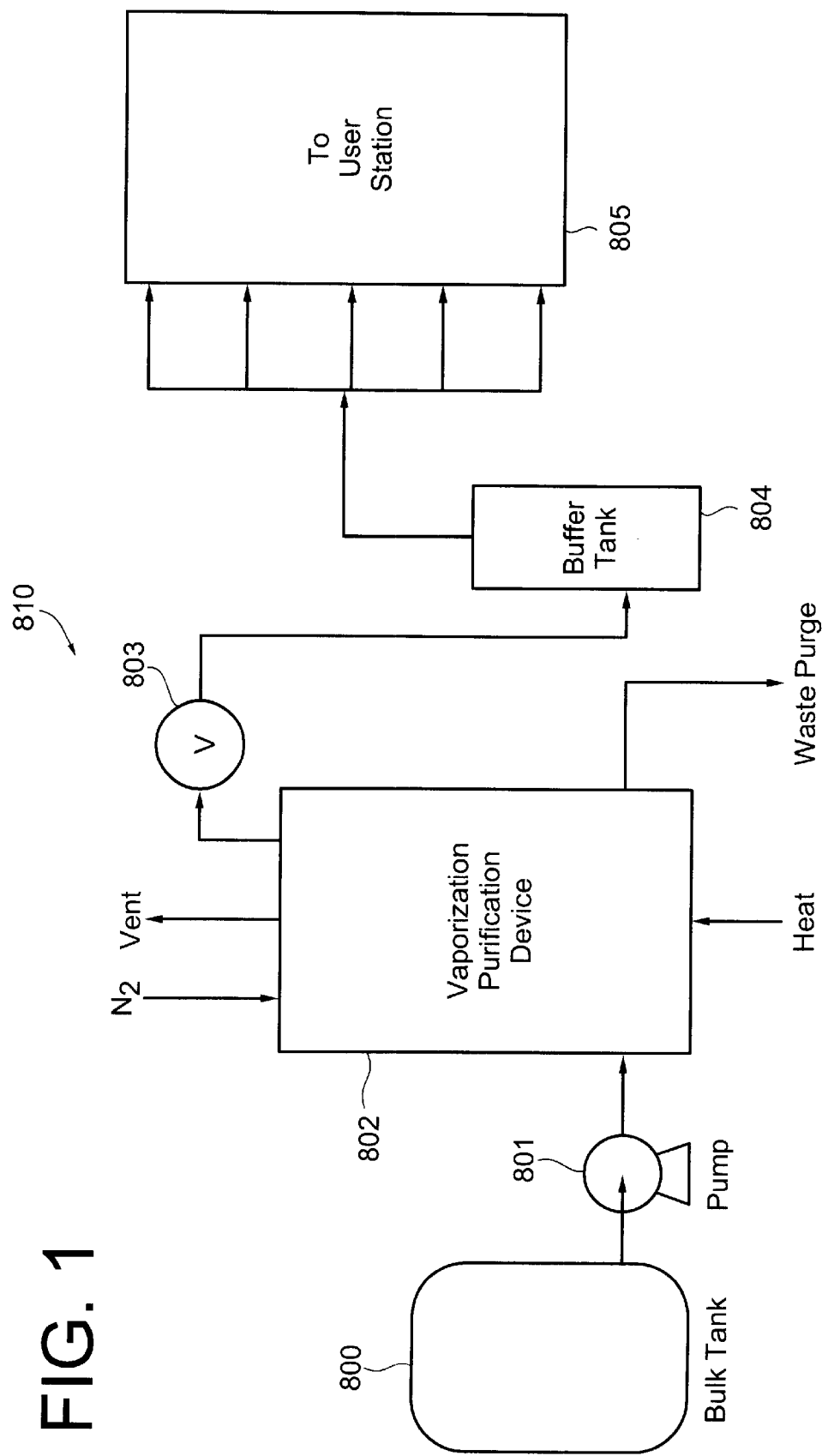
FIG. 1 is a schematic illustration of a system for distributing chemical gases from a bulk source to the user stations.

As illustrated in FIG. 1, liquefied gas from bulk source 800 is supplied at a controlled rate via pump 801 to an evaporation-purification device (VPB) 802. The liquid gas passes through a spray nozzle wherein liquid droplets are produced as they enter VPB device 802. The pressure and temperature in the device are controlled so that the droplets evaporate very rapidly and are converted into gas. Thus, the impurities in the liquid are left behind in the form of solid particles. The portion of particles having a large size are purged out of the device with a constant purge flow (or intermittent flow) at the bottom of device 802 in an effortless manner due to the particle inertia. The remaining particles of smaller size that may remain entrained in the gas vapor can be removed via a filter (not shown) disposed between the device and buffer tank 804.

Volatile impurities, such as those gaseous impurities with lower boiling point, are partially released from the liquefied gas prior to entering the vaporization device. These impurities are more soluble in a gaseous phase and are referred to as light impurities. On the other hand, a portion of the gaseous impurities having a high boiling point remain in the particulate phase that is purged out of the device with the large size particles, as mentioned above. The remaining gaseous impurities which exhibit a higher density can also be purged out of the device in a similar manner. Upon removal of the impurities, the purified gas is conveyed through the filter to buffer tank 804 under controlled pressure regulated by valve 803 and thereafter to user stations 805 through a distribution manifold.

Figure 2:
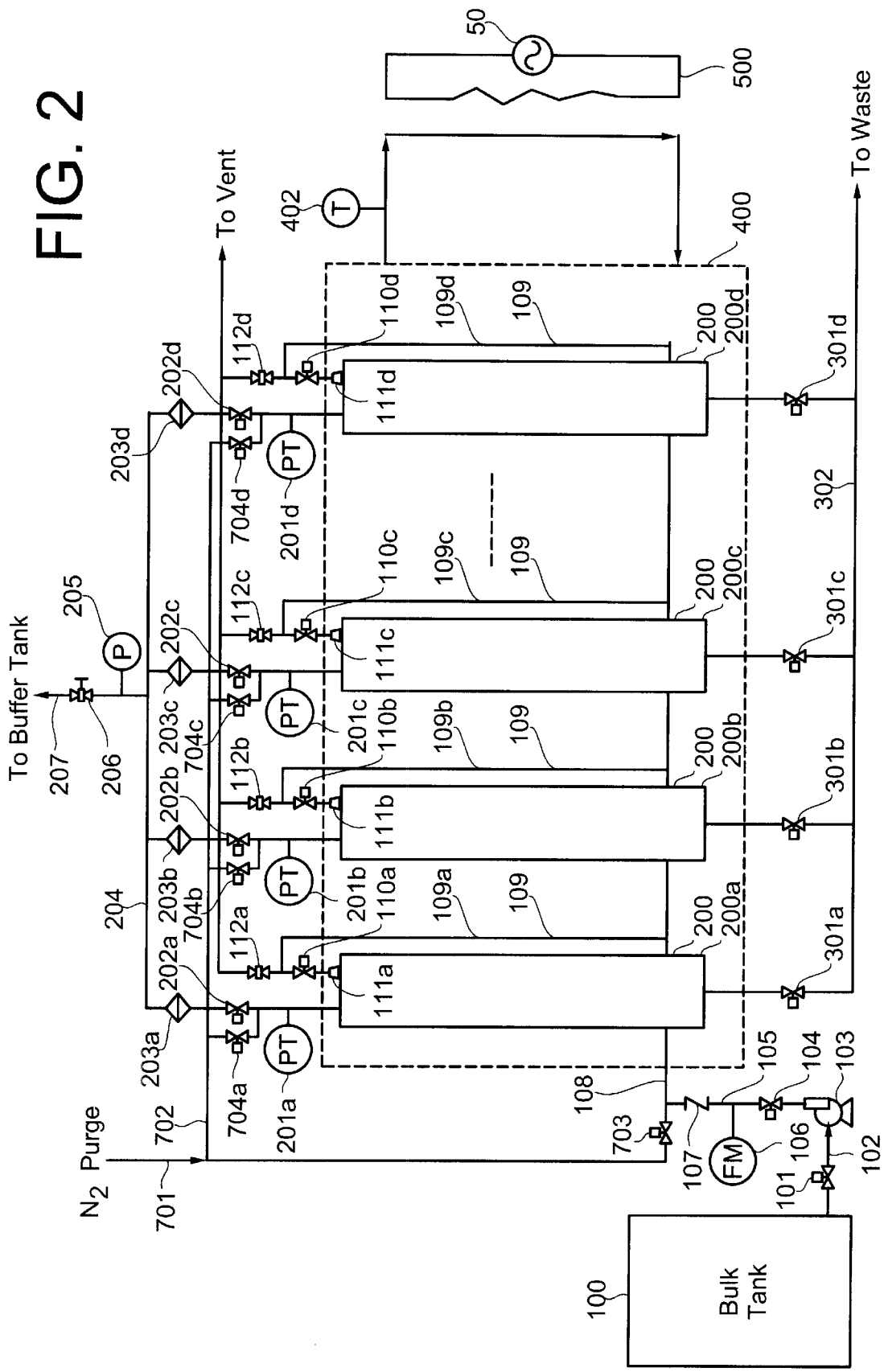
FIG. 2 is a schematic illustration of a system for vaporizing and purifying liquefied gases.

In a preferred embodiment, and with reference to FIG. 2, a pump 103 disposed in close proximity to bulk tank 100 delivers liquefied gas to vaporization-purification device (VPB) 200 from the tank. Optionally, a duplicate pump may be installed in parallel to ensure that no shut-down of the system is necessary, should the pump require to be replaced or maintained. Suitable pumps for the operation includes pumps made from materials compatible with the chemicals and capable of handling a pressure head high enough to introduce the liquid chemicals into device (VPB) 200. Preferably, the pump is a gear pump available from several manufacturers, such as Pulsafeeder, Inc. (Rochester, N.Y.).

The liquid chemical is pumped from bulk tank 100 through a pneumatic valve 101 disposed on conduit 102, to a pneumatic valve 104 positioned on conduit 105 and a check valve 107 downstream of the pump which prevents backflow of the liquid chemical to tank 100. Pneumatic valves 101 and 104 are utilized to automatically turn on and off the flow. Valve 101 may be a hand valve for isolating the pump from the liquid in the bulk tank in case the tank or pump require maintenance or replacement. An additional hand valve, not shown, can be installed downstream of pump 103 for the same purpose.

A flow meter 106 is disposed on conduit 105 to monitor the total flow through this conduit. Flow meters suitable for this operation includes those of differential pressure type, ultrasonic type, and vortex type with an electric signal output for automatic operation. This flow meter can be combined with a motor driven valve for monitoring and controlling the flow.

The liquid chemical is further conveyed through conduit 108 into a temperature-controlled containment device 400. This containment device may be of plastic or metal material capable of both holding a heating agent and insulating the vapor purification device. The heat agent employed may be hot water or hot air provided from heater 500 which is in turn controlled by power supply 501. The heating agent is circulated with a pump or a fan into the temperature-controlled containment device and the temperature is monitored with a temperature probe 402, such as a thermocouple. The circulation flow rate of the heating agent can be controlled based on the heat required to obtain the optimum temperature inside the temperature-controlled containment device. A direct heating device, such as electric wire, heat tapes, or heat lamp, can be equally employed instead of the heating agent for temperature control purposes. In this case, the temperature containment device may be eliminated.

The liquid chemical conveyed through conduit 108, and dispersing conduit 109a, 109b, 109c, and 109d is heated to a predetermined temperature. This temperature is preferred to be equal to or higher than the boiling temperature of the chemical at a controlled pressure inside VPB device 200. A more preferred temperature is higher than maximum ambient temperature for a stable operation of gases with a high critical temperature. As used herein, the term "ambient" refers to the atmosphere surrounding the temperature-controlled containment device.

For those gases with a low critical temperature, the temperature can be controlled only based on the pressure inside the VPB device. In this case, the heating agent, mentioned above, will function as a cooling agent. Thus, pump 103 is by-passed, since the vapor pressure is high at normal ambient temperature. Those liquefied gases can, therefore, be transferred from the bulk tank to the VPB device under their own vapor pressure. For example, HCl has very high vapor pressure at room temperature. It can be transferred in liquid form and pre-cooled to a temperature of as low as 243 K (−30° C.) through conduits 108 and 109.

The pre-heated liquid chemical is subsequently routed through one or more pneumatic valve 110a, 110b, 110c or 110d to jet nozzle 111a, 111b, 111c, or 111d, wherein the pneumatic valve as well as the pressure relief valve 112a, 112b, 112c, 112d are located outside of the temperature-controlled containment device 400.

Preferably, one or more VPB devices are set in parallel within containment device 400 to meet different needs for the different types of chemical gases employed. Any one or all of the beds can be in full operation or idle by manipulating the liquid control valve 110a, 110b, 110c, or 110d. The VPB device operation can be easily stopped or quickly resumed by turning on or off the liquid chemical control valve. During normal operating conditions conduit 109a, 109b, 109c, 109d and the VPB device 200a, 200b, 200c, and 200d are maintained at a constant temperature regardless of the operation mode and preferably at a lower pressure than the pressure in conduit 109. This pressure differential induces the liquid jet through the nozzle to produce liquid droplets. Pressure relief valve 112a, 112b, 112c, or 112d is provided on conduit 109 to release gas trapped within and eliminate the light impurities. Some of the more volatile gaseous impurities are trapped in the gas and released into a waste vent.

The droplets introduced into the VPB device as a result of the pressure differential evaporate very rapidly to produce gases under the low pressure and high temperature inside the VPB device. The droplets flow with the gases towards the distal end of the VPB device and continue to evaporate. Thus, substantially all of the gas evaporates and the non-volatile residues and high boiling point impurities are left behind in the VPB device as particles.

Depending on the droplet initial diameter and the impurity concentration, particles of varying diameter remain in the VPB device. Large particles, as well as some of the heavier gaseous impurities, will flow to the bottom of the bed under their own inertia. These gases and particles are subsequently purged out of the bed at a low flow rate (for example, a rate less that 5% of the total flow) through control valve 301a, 301b, 301c, or 301d disposed on conduit 302 outside of the temperature-controlled containment device 400 and further directed to a waste scrubber or a device for recycle (not shown).

Figure 3:
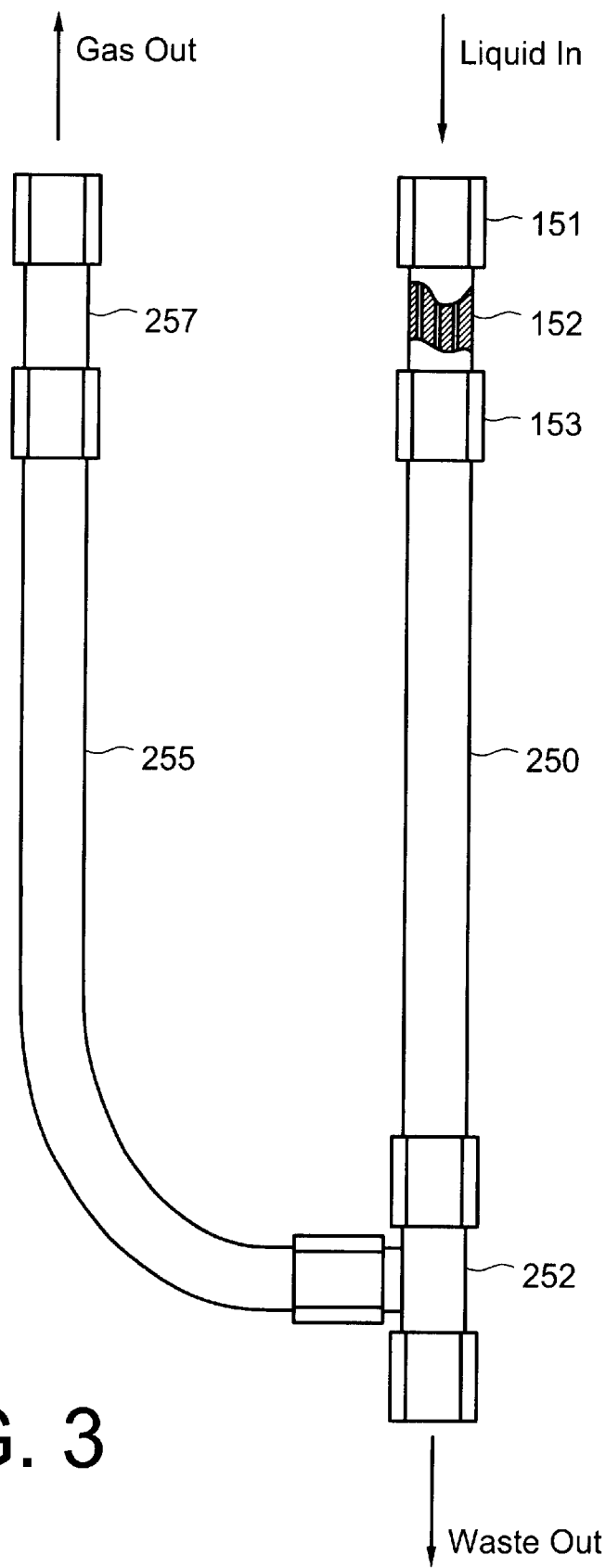
FIG. 3 is a perspective view of a vaporization-purification device.

The VPB device 200 is further expounded on with reference to FIG. 3. The droplets enter main body 250 where they are converted into vapor. A nozzle 152 is set right on the top of the main body and is connected with a threaded nut 153. The liquid input tube is attached to the nozzle with another threaded nut 151 and the liquid chemical is introduced therein. The main body 250 may be a tube having a diameter ranging from ¼ in. (0.635 cm) to 2 in. (5.08 cm). Suitable materials for the main body include stainless steel, HASTELLOY®, TEFLON®, or other materials compatible with the chemical gases and are capable of handling high pressures.

The total surface area for heat transfer necessary to evaporate the liquid determines the length of main body 250. The nozzle 152 may be the same materials as the ones for the main body. Nozzles 152 may include several jet channels with a diameter ranging from 20 $\mu$m to 1000 $\mu$m each, preferably about 500 $\mu$m. Accordingly, the liquid droplet diameter is dependent primarily on the liquid's physical properties and the nozzle size. In a preferred embodiment, the droplet diameter is approximately in the range of about 1.5 to about 2.5 times the nozzle diameter. The optimum droplet size, or the nozzle diameter, can be determined based on the complete evaporation time of the droplet and the length of the main body. Suitable nozzles can include those manufactured by BETE Fog Nozzle Inc. of Greenfield, Mass.

The gas exiting main body 250 flows to an optional secondary body 255 through a three-way connector 252 for further evaporating any remaining small droplets and mist. This secondary body may be of the same diameter and material as main body 250. It is preferably bent at one end and connected to the main body via connector 252. This secondary body may be eliminated, but preferred to ensure a complete vaporization, and also for leading any particles and liquid back to the connector 252 so as to purge them out of the VPB device. The gas is passed through secondary body 255 to an optional mist eliminator 257 whose employment is dependent on the gas property and operational conditions. This mist eliminator may be made of a section of tube similar to the one of the main body and filled with some porous materials compatible with the chemicals (e.g., TEFLON® fibers). In case mist eliminator 257 is employed, the portion of the VPB device with the eliminator can be extended to outside of the temperature-controlled containment 400, for ease of maintenance.

As illustrated in FIG. 2, sensor 201a, 201b, 201c, and 201d monitors the pressure and temperature of the gas within the VPB device. A back-pressure valve 202a, 202b, 202c, and 202d is utilized for keeping the necessary pressure inside the VPB device. This valve should be as close to the VPB device as possible to prevent any condensation of 203a, 203b, 203c, 203d wherein the remaining particles are removed. Suitable filters employed may be filters from several manufacturers, such as Ultramet-L Gaskleen series from Pall Corporation (East Hill, N.Y.).

The ultrapure gas exiting filter 203 of each individual VPB device merges in a conduit 204 and flows through a pressure monitor 205, a pressure controller 206 disposed on conduit 207, to a buffer tank 804 for distribution (as shown in FIG. 2). Of course, the ultrapure gas produced may pass through filter 203 directly to buffer tank 804.

When the need arises for system maintenance, it becomes necessary to purge the VPB device. An inert gas such as nitrogen is introduced through conduits 701 and 702, respectively, and regulated by control valve 704a, 704b, 704c, 704d prior to entry into the VPB device. The inert gas is passed through substantially the entire VPB device and routed to a waste discharge through conduit 302 disposed at a distal end of the VPB device by operating valve 301a, 301b, 301c, and 301d.

Likewise, residual gas and liquid in conduits 108 and 109a, 109b, 109c, 109d can be purged with an inert gas such as nitrogen introduced through valve 703 and removed from the conduit via pressure relief valve 112a, 112b, 112c, 112d leading to vent.

The following example is presented for illustrative purposes and should not be construed as limiting the invention which is delineated in the claims.

EXAMPLE

Ten vaporization-purification devices are installed in parallel for ammonia gas at a flow rate of at most 900 slm. The liquid ammonia is fed into the VPB devices at a temperature of 20° C. Hot water with inlet temperature of 90° C. and outlet temperature of 50° C. circulates through the VPB devices inside a plastic container. The liquefied ammonia is pre-heated to a temperature of 42° C. through a ¼ in. (0.64 cm) OD 316L stainless steel tube with a length of 2 ft. (61 cm). For each bed, the pre-heated liquid jets through a nozzle with three jet openings of 400 $\mu$m in diameter each. The main body of the VPB device is a HASTELLOY® tube of 1 in. (2.54 cm) OD and 2.5 ft. (76.2 cm) long. The temperature inside the VPB device is controlled at 420° C. and the pressure is at 145 PSIa (4.79 bars). The secondary body is made with the same tube as for the main body with the length about 3 ft. (91.4 cm) and connected with one end to the main body. The system is operated at the flow rate from zero to about 900 slm.

The ultra-pure ammonia delivered to the buffer tank contains impurities to the order set forth below in Table 1.

TABLE 1

Impurity Concentration in Processed NH₃ gas

| Impurities | Concentration (weight ppb) | Impurities | Concentration (volume ppm) |
|---|---|---|---|
| Na | <5 | $N_2$ | <2.0 |
| Zn | <10 | $O_2$ | <0.2 |
| Fe | <200 | CO | <0.05 |
| Cu | <50 | $CO_2$ | <0.5 |
| Ni | <20 | $CH_4$ | <0.05 |
| Cd | <2 | | |
| Cr | <5 | | |
| P | <2 | | |

In accordance with the illustrative example, the ammonia gas is purified to an ultra-pure form and delivered in vapor phase to the buffer tank in a quick and facile manner.

While this invention has been described in detail with reference to specific embodiments thereof, it will be apparent to one skilled in the art that various changes and modifications can be made, and equivalents employed, without departing from the scope of the appended claims.

What is claimed is:

1. A method for providing ultrapure chemical gases to the point of use at a semiconductor processing facility, comprising:

supplying a chemical gas to a containment chamber having at least one vaporization and purification device therein;

vaporizing and purifying said chemical gas in said containment chamber by passing said chemical gas through said at least one vaporization and purification device;

routing said ultrapure chemical generated to a buffer tank; and distributing said gas to the point of use from said buffer tank.

2. A method according to claim 1, further comprising heating said containment chamber to a predetermined temperature.

3. A method according to claim 1, wherein said chemical gas is supplied at ambient temperatures.

4. A method according to claim 1, wherein the temperature of at least one dispersing conduit leading to said at least one vaporization and purification device is equal to or higher than the boiling temperature at a controlled pressure within said vaporization and purification device.

5. A method for providing ultrapure chemical gases to the point of use at a semiconductor processing facility, comprising:

supplying a chemical gas to a containment chamber having at least one vaporization and purification device therein;

vaporizing and purifying said chemical gas in said containment chamber by passing said chemical gas through said at least one vaporization and purification device;

eliminating light impurities through a pressure relief valve disposed at a top end of said containment chamber;

routing said ultrapure chemical generated to a buffer tank; and distributing said gas to the point of use from said buffer tank.

6. A method according to claim 5, wherein heavy impurities are removed in said vaporization and purification device.

7. A distribution system for ultrapure chemical gases to a point of use at a semiconductor processing facility, comprising:

a liquefied gas source, a vaporization purification device, and a buffer tank, said liquefied gas source being in communication with said vaporization purification device to provide a liquefied gas to said device with an ultrapure chemical vapor gas being generated in said vaporization purification device, said ultrapure chemical vapor gas being routed to said buffer tank and subsequently to the point of use from said buffer tank.

8. The system according to claim 7, wherein at least one pump is disposed downstream of said gas source to supply the liquefied gas to said vaporization purification device in a controlled manner.

9. The system according to claim 7, further comprising a spray nozzle disposed at an inlet of said vaporization purification device to generate liquid droplets.

10. The system according to claim 7, further comprising means for controlling the temperature in said vaporization purification device.

11. The system according to claim 7, further comprising means for controlling the pressure in said vaporization purification device.

12. The system according to claim 7, further comprising purge means for removing volatile impurities from said vaporization purification device.

13. The system according to claim 7, further comprising a regulating valve downstream of said vaporization purification device to route said ultrapure chemical vapor gas generated to the buffer tank.

14. The system according to claim 7, wherein the chemical gas is selected from the group consisting of $Cl_2$, $BCl_3$, $C_3F_8$, $ClF_3$, $SiH_2Cl_2$, $SiHCl_3$, $Si_2H_6$, $SiCl_4$, $NH_3$, HCl, HBr, HF, $N_2O$, $SF_6$, $CO_2$, $CH_3F$, $C_2F_6$, and $WF_6$.

15. A system for vaporizing and purifying a gas, comprising:

a supply tank, wherein a chemical gas is disposed therein;

a temperature containment chamber connected to said supply tank, having at least one vaporization purification device therein; and a buffer tank disposed downstream of said temperature containment chamber.

16. A system according to claim 15, further comprising heating means for attaining a predetermined temperature in said containment chamber.

17. A system according to claim 15, further comprising a temperature probe to monitor the temperature in said temperature containment chamber.

18. A system according to claim 15, wherein said chemical gas is supplied to said containment chamber via a first conduit network.

19. A system according to claim 18, wherein a pump is optionally disposed on said first conduit network to deliver said chemical gas to said containment chamber.

20. A system according to claim 19, further comprising at least one pneumatic valve disposed on said first conduit network to regulate the flow of said chemical gas.

21. A system according to claim 20, further comprising a flow meter downstream of said pneumatic valve to monitor the flow of said chemical gas through said conduit.

22. A system according to claim 20, further comprising a check valve disposed downstream of a flow meter to prevent backflow of said chemical gas.

23. A system according to claim 19, wherein said first conduit network branches into at least one dispersing conduit line to deliver said chemical gas to said at least one vaporization purification device in said containment chamber.

24. A system according to claim 23, wherein said at least one dispersing conduit line includes a valve upstream of an inlet to said vaporization purification device.

25. A system according to claim 23, wherein at least one spray nozzle is disposed at the connection between said at least one dispersing conduit line and said purification device.

26. A system according to claim 18, further comprising a third conduit network in communication with said at least one vaporization purification device to introduce an inert gas therein and purge same.

27. A system according to claim 26, wherein said third conduit network is in communication with said first conduit network to introduce said inert gas and purge same.

28. A system according to claim 26, wherein said third conduit network further comprises a waste discharge conduit to remove the impurities from said at least one vaporization purification device.

29. A system according to claim 15, wherein said at least one vaporization purification device includes a pressure and temperature monitor.

30. A system according to claim 29, wherein a purified gas generated within said vaporization purification device is routed via a second conduit network to said buffer tank.

31. A system according to claim 30, wherein said second conduit network is branched into at least one conduit line in communication with each of said at least one vaporization purification device.

32. A system according to claim 31, further comprising a back-pressure valve on said at least one conduit line in close proximity to said vaporization purification device to maintain a predetermined pressure in said vaporization purification device.

33. A system according to claim 31, further comprising a filter on least one conduit line to remove residual impurities in said chemical gas.

34. A vaporization and purification device, comprising:

a tubular main body having a first and a second end;

said first end having a nozzle connected thereto, wherein a liquid chemical is introduced at a higher pressure than the pressure within said tubular main body to vaporize and purify said chemical; and said second end having a three-way connector attached thereto.

35. The device according to claim 34, wherein a purified gas generated in said tubular body is routed through a first port of said three-way connector and impurities are routed through a second port of said three-way connector.

36. The device according to claim 35, further comprising a secondary tubular body connected to said first port of said three-way connector to further evaporate any remaining liquid gas and removing impurities.

37. The device according to claim 36, further comprising a mist eliminator downstream on said second tubular body to further eliminate any impurities.

38. The device according to claim 34, wherein said nozzle includes several jet channels having a diameter from about 20 $\mu$m to about 1000 $\mu$m.

* * * * *